(No Model.) 3 Sheets—Sheet 1.
G. C. WARD.
GENERAL INDEX AND ALPHABETICAL RECORD.
No. 564,670. Patented July 28, 1896.
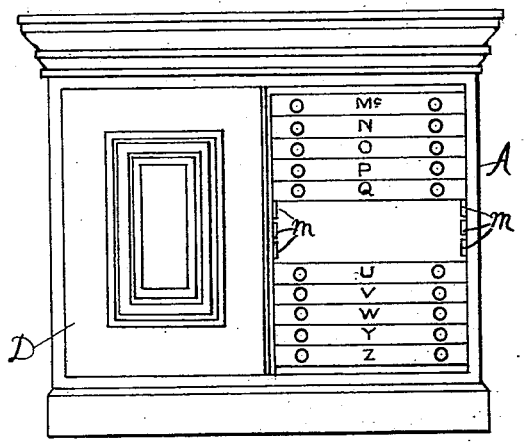
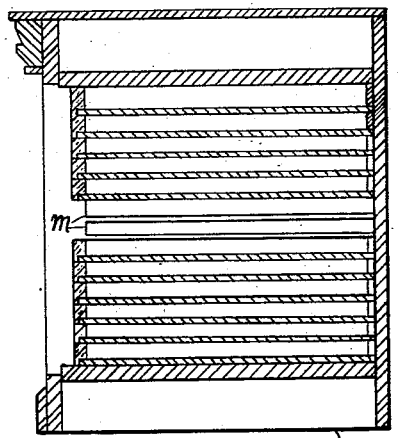
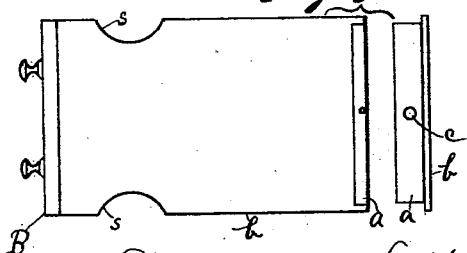
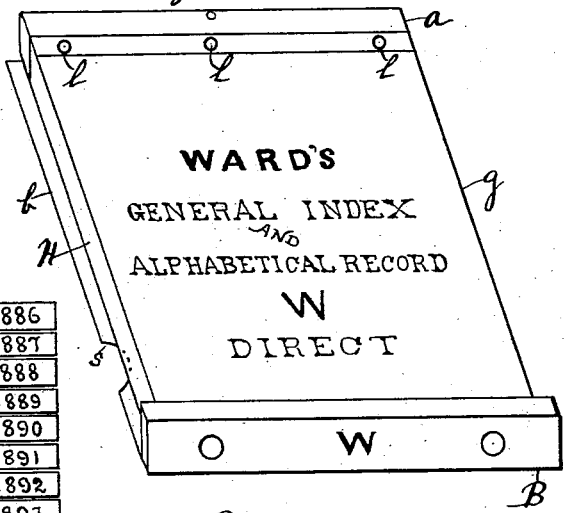
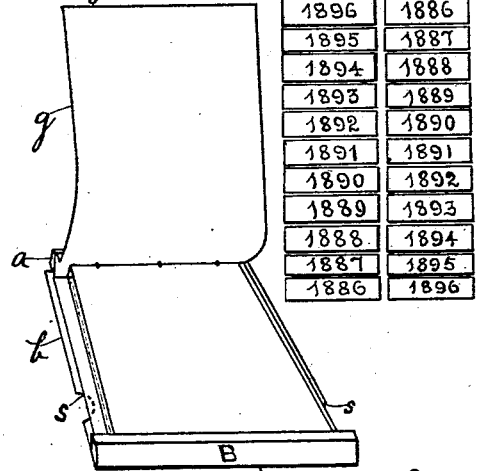
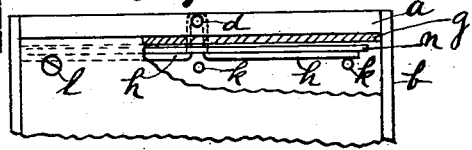
Witnesses:
R. E. L. Roy
R. H. Morgan
Inventor,
G. C. Ward,
By A. L. Jackson,
Attorney.

(No Model.) 3 Sheets—Sheet 2.

G. C. WARD.
GENERAL INDEX AND ALPHABETICAL RECORD.

No. 564,670. Patented July 28, 1896.

Witnesses:
R. E. L. Roy.
R. H. Gorgas.

Inventor
G. C. Ward,
By A. L. Jackson,
Attorney.

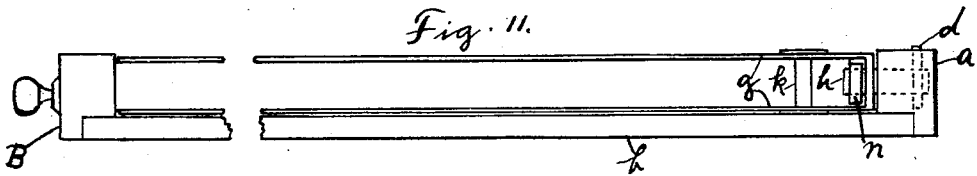

UNITED STATES PATENT OFFICE.

GEORGE C. WARD, OF FORT WORTH, TEXAS.

GENERAL INDEX AND ALPHABETICAL RECORD.

SPECIFICATION forming part of Letters Patent No. 564,670, dated July 28, 1896.

Application filed February 17, 1896. Serial No. 579,595. (No model.)

*To all whom it may concern:*

Be it known that I, GEORGE C. WARD, a citizen of the United States, residing at Fort Worth, in the county of Tarrant and State of Texas, have invented a new and useful General Index and Alphabetical Record, of which the following is a specification.

My invention relates to cabinet indexes, and the object is to construct an index for records when the records consist of a great many books, and which will take the place of large numbers of indexes in book form. I do this by the construction and combination of various parts hereinafter fully described, and more particularly pointed out in the claims.

Reference is had to the accompanying drawings, forming part of this specification.

Figure 9:
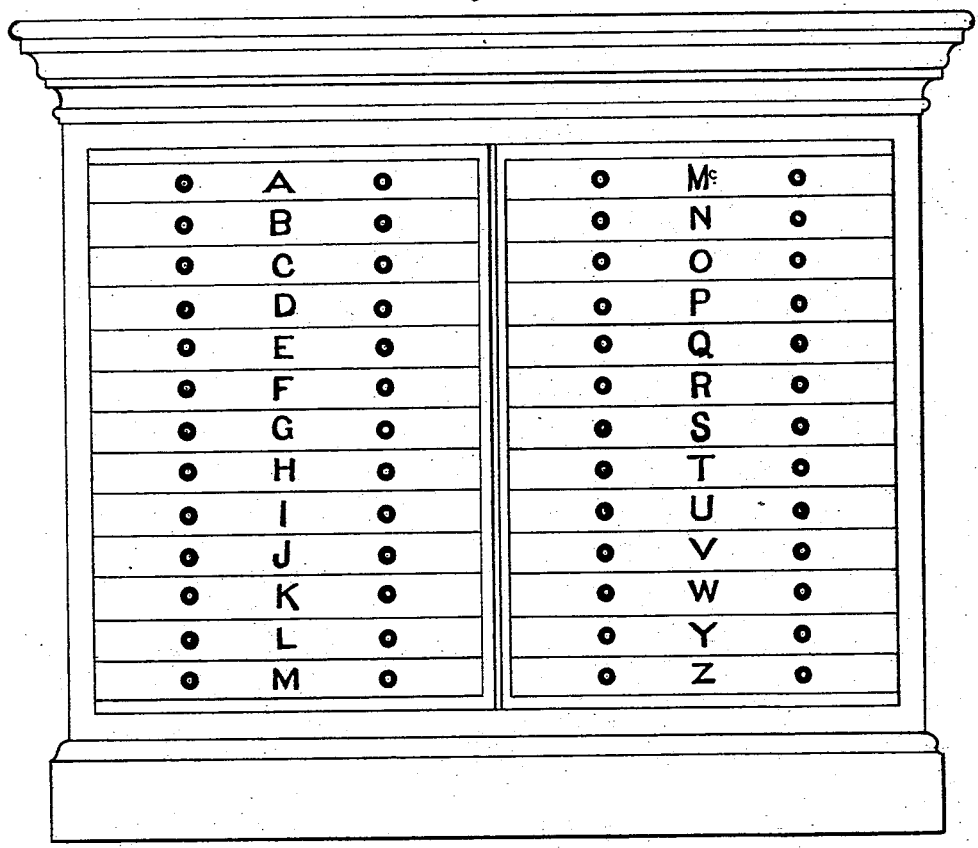
Figure 10:
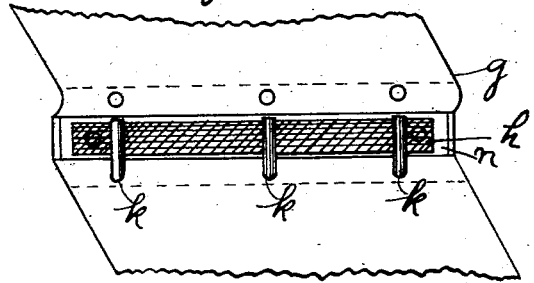

Figure 1 is a front elevation of my invention with one door and three drawers removed. Fig. 2 is a vertical section with two drawers removed. Fig. 3 is a plan and a rear end view of one case. Fig. 4 is a perspective of a case with a part of an index in place. Fig. 5 is a similar view with the index-covering raised. Fig. 6 is a view of the date-strips, showing the arrangement of dates. Fig. 7 is a sectional view in detail. Fig. 8 is an enlarged view of a bolt for holding the sheets and cover together. Fig. 9 is a front elevation of the invention with the doors removed. Fig. 10 is a perspective view in detail showing manner of fastening paper and covering together. Fig. 11 is a side elevation of one of the drawers, showing the manner of attaching the books to the drawers. Figs. 12, 13, 14, and 15 show how the paper is to be used, Figs. 12 and 14 being the direct and Figs. 13 and 15 being the reverse sides.

Similar letters of reference indicate the same parts throughout the several views.

In the drawings, A indicates a case of ordinary construction, having doors D, only one of which is shown. Twenty-six drawers, or a drawer for each letter of the alphabet, are held in this case. The drawers consist of three pieces, a front B, a back $a$, and a bottom $b$. The drawers have no sides. In lieu thereof strips $m$ are attached to the inside of case A, which constitute sides for the drawers and also supports for the drawers. When the drawers are shoved in the case, the front pieces B come to rest against the strips $m$, as shown in Fig. 2. The drawers are cut away, as shown in Figs. 3, 4, and 5, to form a recess $s$, or a place for the hand to reach under the sheets of paper. One hundred and fifty sheets are put in each drawer, or as many as may be needed, and a covering $g$ is provided for the upper, back, and lower parts of the paper. Screw-bolts having thin flat heads and consisting of female part $k$ and male part $l$ are used to hold the sheets of paper and the covering together in book form, the paper having holes cut near the ends to receive the bolts. This construction is adopted in order to permit the insertion or removal of the sheets.

The indexes are attached to the back ends of the drawers by means of elastic straps $h$, one in each drawer. I attach the strap $h$ to a thin bar or strip $n$ of suitable material. This strip $n$ is placed between the back ends of the sheets of paper and the part of the covering $g$ that is bent around the back end of the sheets of paper. The strip $n$ has a hole through the middle. Holes are made in the back $g$ and the back $a$ of the drawer. The ends of the elastic strap $h$ are attached to strip $n$, and the middle part is drawn back through the back of the covering and the drawer and held back by means of a pin $d$, which is inserted in the back $a$ of the drawer. (See Fig. 7.) The hole for pin $d$ intercepts the hole $c$ in the back $a$.

It will be seen that the elastic straps $h$ will hold the index back in the drawers. The necessity of these straps will be better understood from the explanation of the use of the indexes. Both faces of the sheets of paper are used. One side is called the direct side and the other side the reverse. (See Fig. 4.) It will be seen that the index can be turned over without entirely withdrawing it from the drawer, and when turned over the straps $h$ will draw the index to its proper place and hold it there. It will be understood now why the recesses $s$ are cut in the bottoms of the drawers. Date-strips, as shown in Fig. 6, are attached to the edges of the sheets of paper, or the dates may be put on the edges of the paper and the paper above each date cut away. On the direct side the dates are arranged as shown on left of Fig. 6, the bottom sheet having the oldest date. On the reverse side of the index the dates are reversed, the top sheet having the oldest date, all the dates being so arranged that they can be seen.

The drawers are illustrated as being of uniform size. I do not confine myself to any particular size, as the records under some letters of the alphabet will require more space than the records under other letters, e. g., those under "B," "S," "H," &c., will require more space than those under "Q," "X," "I," &c.

The several parts may be made of any suitable material.

Having fully described my invention, what I claim as new, and desire to secure by Letters Patent, is—

1. A general index and alphabetical record having a suitable case, drawers arranged in said case, paper provided with suitable coverings arranged in said drawers, said paper and coverings forming a book for each drawer, and means for holding said books in said drawers consisting of screw-bolts for holding said paper and coverings together, a strip placed between the back ends of said paper and its covering in each drawer, an elastic strap attached to said strip, and a pin for holding said strap in the back piece of each drawer.

2. A general index and alphabetical record consisting of suitable supporting-cases, sheets of paper, covering for said paper, screw-bolts for attaching said covering on said paper and for holding said paper together, and means for attaching said paper and covering to each of said cases consisting of a strip of wood or other material inserted between said covering and the back ends of said paper, an elastic strap attached to said strip, and a pin inserted in the back piece of each case for holding said strap, whereby said paper and covering can be reversed, substantially as described.

GEORGE C. WARD.

Witnesses:
GEO. W. AKERS,
R. H. M. NOTT.